Figure 1:
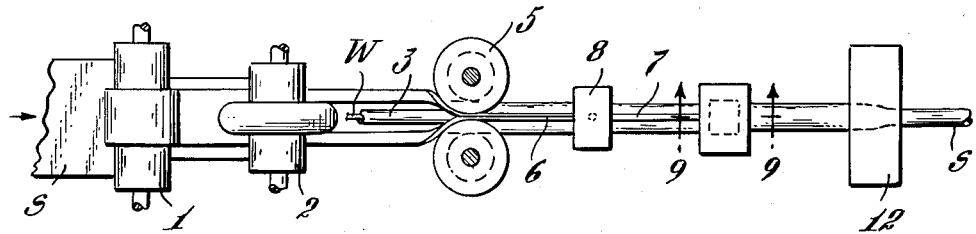

March 14, 1961  R. S. DONALD  2,975,087

METHOD AND APPARATUS FOR MAKING SHIELDED WIRE

Filed Sept. 3, 1957

Inventor
Russell S. Donald
by Roberts, Cushman & Grover
Attys

United States Patent Office 2,975,087
Patented Mar. 14, 1961

2,975,087
METHOD AND APPARATUS FOR MAKING SHIELDED WIRE

Russell S. Donald, Trumbull, Conn., assignor to Electrarc, Inc., Boston, Mass., a corporation of Massachusetts Filed Sept. 3, 1957, Ser. No. 681,661

3 Claims. (Cl. 154—2.25)

While this invention is especially adapted for shielding insulated cables, it is also useful in shielding single wires, particularly insulated wires.

In shielding cables it is customary to fold a metallic ribbon around the cable until the edges meet or overlap, then weld the edges together to form a seam and then smooth out the seam by drawing the shielded cable through a swaging die. However the methods and apparatus heretofore available have not been satisfactory for various reasons. One difficulty is that the insulation around the cable is often damaged by the heat of welding. Another common difficulty consists in that the insulation is damaged by pressure of the weld seam as the shielded cable is drawn through the swaging die.

Objects of the present invention are to overcome the disadvantages of prior methods and apparatus, to weld the edges of the shield together and then smooth out the seam without damaging the insulation and to provide apparatus for this purpose which is simple and economical in construction and which is durable and reliable in use.

In one aspect the present invention involves a method which comprises continuously folding a shielding ribbon around the wire with a space between the wire and ribbon, joining the edges of the ribbon together at a seam, smoothing the seam to substantially uniform thickness and subsequently contracting the shield substantially to close the aforesaid space.

In other aspect the invention involves apparatus comprising means for feeding the wire along a predetermined path, at one location along the path means for continuously folding a shielding ribbon around the wire with a space between the wire and ribbon, at another location farther along the path means for joining the edges of the ribbon together at a seam, at another location still farther along the path means for smoothing the seam to substantially uniform thickness, and at another location still farther along the path means for contracting the shield substantially to close the aforesaid space.

In a more specific aspect the invention involves a guide for guiding the wire to the ribbon at one location along the aforesaid path and thence along the path to a second location, with means between the locations for transversely folding the ribbon around the wire and guide and means at the second location for swaging the meeting edges of the ribbon together, the swaging means including a part of the guide.

Figure 2:
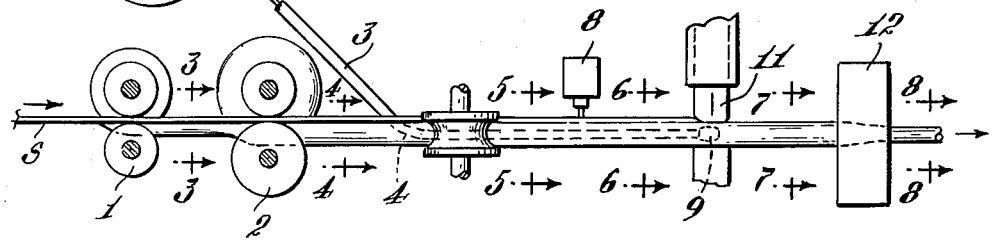
Figure 9:
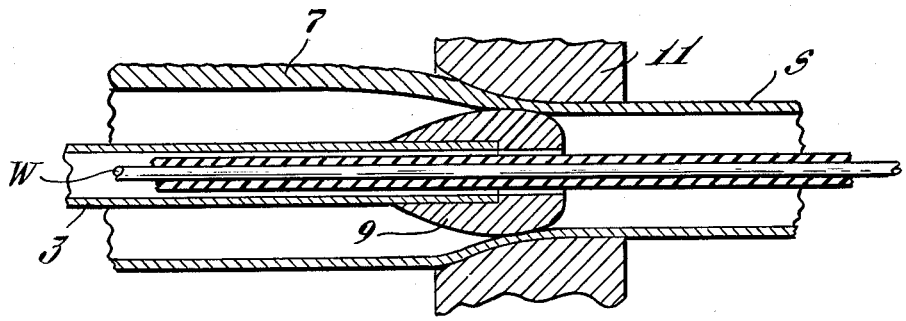

For the purpose of illustration a typical embodiment of the invention is shown in the accompanying drawings in which:

Fig. 1 is a plan view, more or less diagrammatic;
Fig. 2 is a similar side view;
Figs. 3 to 8 are sections on lines of corresponding number in Fig. 2; and
Fig. 9 is a section on line 9—9 of Fig. 1.

Figures 3, 4, 5, 6, 7, 8:
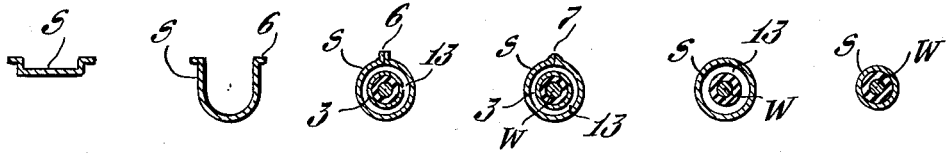

The particular embodiment of the invention chosen for the purpose of illustration comprises means for feeding a wire W and shielding ribbon S together and thence along a common path. While the ribbon S may be made of any one of various materials, usually it is made of aluminum. The ribbon first passes between a pair of forming rolls 1 where it is bent to the shape shown in Fig. 3. Thence the ribbon passes between another pair of rolls 2 where it is bent to the shape shown in Fig. 4. While in this shape the wire W is fed from a reel R into a tube 3 which extends into the U-shaped ribbon at the location 4 in Fig. 2. Immediately in advance of this location a pair of rolls 5 bend the ribbon to the shape shown in Fig. 5 where the bent margins 6 abut each other face to face. After the edges are thus brought together they are welded into a seam 7 by means of any suitable welder as indicated diagrammatically at 8 in Fig. 2. The welding seam is then smoothed out by an interior die 9 and an exterior die 11, the interior die being mounted on the end of the tube 3. After the seam has been smoothed the shielded wire passes through another swaging device 12 which compresses the shield snugly around the cable as shown in Fig. 8.

From the foregoing it will be understood that the ribbon S is folded around the wire W at one location along the path of the wire, the location of the folding rolls 5, that the die 9 and swaging means 11 are located at a second location along said path, and that the tube 3 extends from the second location back along said path past the first location to hold the die at the second location.

An important feature of the invention consists in that the cable is protected from the heat of the welding apparatus by means of the tube 3. Another important feature consists in that the cable is protected from the welding heat by the air space 13 as illustrated in Figs. 5 and 6. Still another important feature of the invention consists in that the seam 7 is smoothed without pressing the seam against the cable so that the smoothing operation does not damage the cable insulation.

It should be understood that the present disclosure is for the purpose of illustration only and that this invention includes all modifications and equivalents which fall within the scope of the appended claims.

I claim:

1. The method of shielding wire covered with insulation which comprises feeding the wire along a predetermined path past first and second locations, at said first location folding shielding ribbon around the wire to form a tube, between said locations applying heat to the edges of the ribbon to weld them together at a seam while shielding said insulation against the heat, and at said second location compressing the tube to smooth out the seam while protecting said insulation against pressure of the seam.

2. Apparatus for shielding wire covered with insulation which comprises means for feeding the wire along a predetermined path past first and second locations, means at said first location for folding shielding ribbon around the wire to form a tube, means between said locations for applying heat to the edges of the ribbon to weld them together at a seam, a shield to protect said insulation against the heat, at said second location means for compressing the tube to smooth out the seam and means for protecting said insulation against pressure of the seam, said shield comprises a tube extending from the second location back past the first location and said last means comprises an anvil anchored to the tube.

3. Apparatus for shielding wire covered with insulation which comprises means for guiding the wire along a predetermined path past first and second locations, means at said first location for folding shielding ribbon around the wire to form a tube, means between said locations for applying heat to the edges of the ribbon to weld them together at a seam, and at said second location means for swaging the tube to smooth out the seam, said guiding means comprising a tube to protect the insulation against said heat, and a part of said swaging means constituting a part of said guiding means.

(References on following page)

References Cited in the file of this patent

UNITED STATES PATENTS

| | | |
|---|---|---|
| 1,794,902 | Johnson | Mar. 3, 1931 |
| 2,044,491 | Anderson | June 16, 1936 |
| 2,243,979 | Reynolds | June 3, 1941 |
| 2,253,069 | Eckel et al. | Aug. 19, 1941 |
| 2,262,716 | Wolfer | Nov. 11, 1941 |
| 2,372,645 | Barmack | Apr. 3, 1945 |
| 2,697,772 | Kinghorn | Dec. 21, 1954 |
| 2,714,447 | Gardes | Aug. 2, 1955 |
| 2,803,730 | Kinghorn | Aug. 20, 1957 |
| 2,808,492 | Yohe | Oct. 1, 1957 |
| 2,816,356 | Hobrock | Dec. 17, 1957 |

FOREIGN PATENTS

| | | |
|---|---|---|
| 362,292 | Great Britain | Dec. 3, 1931 |
| 631,127 | Great Britain | Oct. 27, 1949 |